US008384762B2

(12) United States Patent
Markham et al.

(10) Patent No.: US 8,384,762 B2
(45) Date of Patent: Feb. 26, 2013

(54) METHOD AND APPARATUS FOR DISPLAYING STEREOGRAPHIC IMAGES OF A REGION

(75) Inventors: Keith Christopher Markham, Bristol (GB); Martin Simon Gate, Bristol (GB)

(73) Assignee: MBDA UK Limited, Hertfordshire (GB)

( * ) Notice: Subject to any disclaimer, the term of this patent is extended or adjusted under 35 U.S.C. 154(b) by 90 days.

(21) Appl. No.: 12/600,676

(22) PCT Filed: Sep. 18, 2009

(86) PCT No.: PCT/GB2009/051215
§ 371 (c)(1),
(2), (4) Date: Apr. 7, 2010

(87) PCT Pub. No.: WO2010/032058
PCT Pub. Date: Mar. 25, 2010

(65) Prior Publication Data
US 2011/0228047 A1 Sep. 22, 2011

(30) Foreign Application Priority Data

Sep. 19, 2008 (EP) ..................................... 08253085
Sep. 19, 2008 (GB) ..................................... 817198.5

(51) Int. Cl.
*H04N 13/00* (2006.01)
(52) U.S. Cl. .. 348/42; 348/43; 348/207.1; 348/E13.074; 348/E13.001; 348/51; 378/41
(58) Field of Classification Search .................... 348/42, 348/43, 50, 51, 207.1, 296, E13.074, E13.001; 378/41
See application file for complete search history.

(56) References Cited

U.S. PATENT DOCUMENTS 4,807,024 A 2/1989 McLaurin et al.

5,090,038 A * 2/1992 Asahina ......................... 378/41
(Continued)

FOREIGN PATENT DOCUMENTS

EP 0 307 283 3/1989
EP 1 005 234 A3 5/2000
(Continued)

OTHER PUBLICATIONS

International Preliminary Report on Patentability dated Dec. 3, 2010.
(Continued)

*Primary Examiner* — Kyung H Shin
(74) *Attorney, Agent, or Firm* — Scully, Scott, Murphy & Presser, P.C.

(57) ABSTRACT

The present invention relates to a method of displaying stereographic images of a region R. The method comprises: moving a vehicle (10) relative to the region, the vehicle carrying a camera system (12) for acquiring images I of the region; during movement of the vehicle relative to the region acquiring a series of temporally sequential multiple images (I1, I2, . . . ) of the region at respective multiple different spaced apart locations (L1, L2, . . . ) of the vehicle relative to the region; displaying successive stereographic images of the region during movement of the vehicle relative to the region. Each stereographic image comprises a first of said multiple images acquired at a first location and a second of said multiple images acquired at a second location which are temporally spaced apart in the series one from the other. The method comprises the step of varying the temporal spacing of the first of said multiple images and the second of said multiple images according to a velocity of the vehicle relative to the region so that the spatial separation between the first and the second locations is not less than a predetermined amount so that the stereographic images having a required depth can be displayed independent of the velocity of the vehicle relative to the region.

19 Claims, 5 Drawing Sheets

U.S. PATENT DOCUMENTS

| | | | |
|---|---|---|---|
| 5,953,054 A | 9/1999 | Mercier | |
| 6,678,394 B1 | 1/2004 | Nichani | |
| 6,882,361 B1 * | 4/2005 | Gaylord | 348/207.1 |
| 7,180,536 B2 * | 2/2007 | Wolowelsky et al. | 348/42 |

FOREIGN PATENT DOCUMENTS

| | | |
|---|---|---|
| GB | 2 101 446 A | 1/1983 |
| GB | 2 180 719 A | 4/1987 |
| WO | WO 03/032649 A1 | 4/2003 |
| WO | WO 03/105491 A1 | 12/2003 |

OTHER PUBLICATIONS

International Search Report and Written Opinion dated Jan. 19, 2010.
Extended European Search Report dated Mar. 13, 2009.
UK Search Report dated Jan. 14, 2009.

* cited by examiner

METHOD AND APPARATUS FOR DISPLAYING STEREOGRAPHIC IMAGES OF A REGION

The present invention relates to a method and apparatus for displaying stereographic images of a region. For example, an embodiment of the present invention relates to displaying to a remotely located operator a target region surveyed by an unmanned aerial vehicle (UAV) in the form of a loitering missile.

BACKGROUND OF THE INVENTION

It is known to capture real-time 2-D images by means of a camera carried by an unmanned aerial vehicle (UAV) and to transmit those images to a remote location for display on a display device. A human operator may then view the images at the remote location. Such a system can be used in connection with loitering airborne munitions to enable an operator to detect, recognise and identify a target. Current systems use 2-D images relayed to the operator for target re-acquisition decision making where the perception of perspective and depth is limited. The present invention is concerned with a system and method that enables the afore-described real-time display of a 2-D image of a region to be improved by means of displaying a stereographic image.

A known method of producing a stereographic image is to capture simultaneously images with two spaced-apart cameras and using the image captured by one camera as the left image of a stereographic image and the image captured by the other camera image as the right image of the stereographic view. Providing two cameras on board the aircraft to provide a stereographic display for the operator might improve the usefulness of the images displayed to the operator, in comparison to a conventional 2-D system, but would require an extra camera and would only provide a relatively flat stereographic image as a result of the likely small separation of the two cameras on the UAV (in practice very unlikely to be more than 4,000 mm) relative to the separation of the UAV and the intended target (typically of the order of a few kilometers or greater)

WO03/032649 relates to an aerial reconnaissance camera system. A single camera in a moving aircraft rotates fore and aft to capture images of the surrounding terrain in different directions so that, as the aircraft flies past, any given location in the terrain of interest is imaged from two different perspectives. The captured images are stored on a suitable recording medium for subsequent production of stereoscopic images of the terrain. The apparatus of WO03/032649 is thus able to map an area of terrain for subsequent analysis, including production of stereographic images, but can not assist in providing real-time stereographic information concerning a particular region in the terrain being mapped.

The present invention seeks to provide an improved method and apparatus for displaying stereographic images of a region.

SUMMARY OF THE INVENTION

The present invention provides a method of displaying stereographic images of a region, the method comprising the following steps:

moving a vehicle relative to the region, the vehicle carrying a camera system for acquiring images of the region, during movement of the vehicle relative to the region acquiring a series of temporally sequential multiple images of the region at respective multiple different spaced apart locations of the vehicle relative to the region, displaying successive stereographic images of the region during movement of the vehicle relative to the region, wherein each stereographic image comprises a first of said multiple images acquired at a first location and a second of said multiple images acquired at a second location which are temporally spaced apart in the series one from the other, and varying the temporal spacing of the first of said multiple images and the second of said multiple images according to a velocity of the vehicle relative to the region so that the spatial separation between the first and the second locations is not less than a predetermined amount so that the stereographic images having a required depth can be displayed independent of the velocity of the vehicle relative to the region.

The present also provides apparatus for displaying stereographic images of a region, comprising:

a camera system mountable on a vehicle for acquiring a series of temporally sequential multiple images of the region at respective multiple different spaced apart locations of the vehicle relative to the region during movement of the vehicle, a display device for displaying successive stereographic images of the region during movement of the vehicle relative to the region, and a control unit configured for controlling the display of stereographic images so that each stereographic image comprises a first of said multiple images acquired at a first location and a second of said multiple images acquired at a second location which are temporally spaced apart in the series one from the other, and for varying the temporal spacing of the first of said multiple images and the second of said multiple images according to a velocity of the vehicle relative to the region so that the spatial separation between the first and the second locations is not less than a predetermined amount so that the stereographic images having a required depth can be displayed independent of the velocity of the vehicle relative to the region.

The present invention also provides a method of displaying stereographic images of a region (and apparatus configured for carrying out the method), the method comprising the following steps:

moving a vehicle relative to the region and outputting movement data from an on-board system corresponding to vehicle movement;

acquiring images of the region with a camera system comprising a camera mounted on the vehicle and orientating the camera so that it is along a line of sight with the region irrespective of movement of the vehicle, and outputting orientation data corresponding to the orientation of the camera;

during movement of the vehicle relative to the region acquiring a series of temporally sequential multiple images of the region at respective multiple different spaced apart locations of the vehicle relative to the region whereby the images are acquired at different respective image vectors relative to the region, displaying successive stereographic images of the region during movement of the vehicle relative to the region, wherein each stereographic image comprises a first of said multiple images acquired at a first image vector and a second of said multiple images acquired at a second image vector which are temporally spaced apart in the series one from the other, and rectifying one or both of the first of said multiple images and the second of said multiple images according to an angle between the first image vector and the second image vector in the displayed stereographic image dependent on the movement data and orientation data.

The vehicle may be an aircraft. The vehicle may be unmanned. The vehicle may be a UAV (unmanned aerial vehicle).

The camera system may comprise a single camera that acquires both the first image and the second image.

The camera system may comprise a moveable camera, which moves relative to the vehicle between capturing images of the region. The camera may move relative to the vehicle to track the region. Thus, the method may include a step of analysing characteristics of a particular target region and may then move between capturing successive images to track the target region. For example, the position of the target region may be known and the position and orientation of the vehicle relative to the target region may be derived from instrumentation on-board the vehicle and then used to move the camera to acquire an image of substantially the same region but viewed from a different angle. When moving a moveable camera to track a particular target region, one or more distinctive and recognisable features of a target region may be ascertained and then tracked in between capturing successive images of the target region.

The camera system may comprise a static camera, which remains stationary relative to the vehicle between capturing images of the region.

The stereographic image is advantageously displayed at a remote location. The remote location is preferably on the ground. The remote location is preferably remote from both the vehicle and the region being viewed by the camera system.

The vehicle may carry one or more munitions. The vehicle may be in the form of a missile. The present invention has particular application when the vehicle is a loitering missile. In such a case, the region being viewed will typically be in the form of a potential target.

The method may include a step of altering at least one of the first and second images before it is displayed as part of the stereographic image. In the case where the image vectors of the first and second images are at significantly different angles, the resultant stereoscopic image can appear to have an artificial curvature or distortion. This curvature or distortion can be reduced by transforming one or both images to reduce the apparent angle between the image vectors as perceived by the person viewing the images as a stereoscopic image. This may be achieved by transforming one or both images with reference to a pointing vector, representing a notional direction of viewing. An affine image transformation may be sufficient to effect any necessary transformation, otherwise a full perspective transformation could be applied. Other, different transformations could alternatively, or additionally, be applied. (It will be understood that in the present context, the "image vector" of a captured image is the direction of viewing of the camera in respect of that captured image.)

The step of altering the image(s) may include increasing the overlap between the first and second images. In order to achieve this, the image acquired by the camera may cover an area significantly larger than that displayed in the stereographic image so that the areas of the first and second images not in common may be cropped. Cropping one or both of the images in this manner may allow the effects of unintentional camera movement (for example vibration) to be reduced.

The step of altering the image(s) may include rotating one or both of the first and second images to reduce the difference, if any, between the twist angle of the first and second images. (It will be understood that in the present context, the "twist angle" of a captured image is a measure of the angular position of the camera about the image vector of that captured image.) Again, in order to achieve this, the images acquired by the camera may cover an area significantly larger than that displayed in the stereographic image to enable the images to be transformed without reducing the size of the stereographic image displayed.

The method preferably includes displaying successive stereographic images of the region viewed by the camera system as the vehicle moves relative to the region. The successive stereographic images may be displayed at a rate greater than 2 Hz, preferably at a rate of 10 Hz or greater. The successive stereographic images are preferably displayed substantially in real-time. Thus, there is preferably a delay of less than one second between acquiring an image with the camera system and subsequently using that image (or a transformed version of the image) in the display of a corresponding stereographic image.

It will be appreciated that in order to provide a succession of real-time stereographic images of a region, a succession of images need to be acquired as the vehicle moves relative to the region. Thus, the method may include the further steps of moving the vehicle to a third location and then acquiring, with the camera system, a third image of the region. The stereoscopic image displayed may then be updated by displaying the third image and one of the first and second images.

If the stereographic image comprising the first and second images is considered as the first stereographic image, then the stereographic image comprising the third image and one of the first and second images may be considered as the second stereographic image. Preferably, the second stereographic image is displayed immediately after the first stereographic image has been displayed. The second stereographic image may comprise the second and third images. The second image may be used as one of the right and left images in the first stereographic image and as the other of the right and left images in the second stereographic image. Each of the stereographic images displayed may utilise images that are not acquired one immediately after the other. For example, a stereographic image may be displayed using a pair of images acquired at different times between which other images are acquired for display in other stereographic images. Intervening images may for example be acquired between acquiring the first and second images (and/or between the second and third images). Such intervening images may be displayed in subsequent stereographic images.

Preferably, fourth and subsequent images are acquired at further different locations and are similarly used to display successive stereographic images. Thus, the method may include further steps of moving the vehicle to a fourth location spaced apart from each of the first to third locations, acquiring a fourth image of the region by means of the camera system, whilst the vehicle is at the fourth location, and displaying the third and fourth images as a stereographic image having left and right images, the left image being one of the third and fourth images and the right image being the other one of the third and fourth images.

Each image acquired may be used as a left and a right image, respectively, of two successive stereographic images that are displayed. Alternatively, each image may be used as either the left image or the right image of two successive stereographic images that are displayed.

The vehicle may have a speed greater than 20 ms$^{-1}$. The speed may be less than 300 ms$^{-1}$.

The images acquired by the camera system preferably have image vectors that are transverse to the direction of motion of the vehicle (i.e. including, but not being limited to, being exactly perpendicular to each other). The distance between the camera system and the region being viewed may be greater than 1,000 m. The distance between the locations at which the camera system acquires the images of the region which are used in a single stereographic image may be more than 50 m (preferably 100 m or more). The vehicle may circumnavigate the region being viewed by the camera system. The method may for example include a step of the vehicle moving in circuits, for example loops such as substantially circular loops, around the region. The or each circuit may extend for more than 1,000 m.

The present invention also provides an image capture and display apparatus suitable for use in the method of the invention. The apparatus thus includes a camera system for mounting on a moving vehicle and a display device for displaying stereographic images. The apparatus may also include a transmitter arranged for connection to the camera system and a receiver arranged for connection to the display device. In use, when successive images of a region are acquired by the camera system whilst on a moving vehicle, the images (for example, digital data representative of the images) may thus be sent from the vehicle, via the transmitter and the receiver, to the display device.

The apparatus may also include a control unit arranged to cause successive images of the region acquired by the camera system to be displayed as stereographic images by the display device, whilst the vehicle is still moving. The control unit is preferably arranged to be local to the display device, but may alternatively be positioned on the vehicle. There may be control means local to both the camera system and to the display device. The control means may be arranged to perform image processing steps to improve the stereographic image to be displayed. The control means may thus be arranged to receive other data to enable the control means to perform such image processing steps. Such data may for example include positional data derived from systems on-board the vehicle.

The apparatus may further include a switch arranged to cause switching of the display device between display of stereographic images by the display device and display of a 2-dimensional image display by the display device. The 2-D image may be provided by displaying only one image at a time, or by displaying two identical left and right images. The ability to switch between a 2-D image display, which may be familiar to a given human operator, and a 3-D image which may be unfamiliar to the operator but carry more information may enhance the usefulness and usability of the apparatus. The apparatus may thus provide all the functionality of a legacy system as well as the enhancements made possible by means of the present invention.

The present invention also provides a camera system and transmitter arranged for use in the image capture and display apparatus of the present invention. The camera system and transmitter may for example be arranged to acquire and transmit a first image of a region to be viewed and then, after the vehicle on which they are provided has moved to a different location, acquire and transmit a second image of the region. The camera system and transmitter may be so arranged that the first and second images are accompanied by data enabling subsequent transformation of the images to improve the stereographic image to be displayed. The camera system and transmitter may be so arranged that the first and second images are transformed, prior to transmission by the transmitter, to improve the stereographic image to be displayed. The camera system and transmitter may be provided on an aircraft, for example a UAV.

The present invention further provides a display device and receiver arranged for use in the image capture and display apparatus of the present invention. The display device and receiver may for example be arranged to receive successive images from a transmitter and sequentially display successive stereoscopic images, substantially in real-time. The display device and receiver may be so arranged to received with the images data and to use such data to transform the images to improve the stereographic images subsequently displayed. Such image transformation may be performed by a control unit local to the display device and receiver. A local control unit may be used simply to control which images are displayed as the left and right images of the stereographic images displayed.

The present invention yet further provides a control unit arranged for use in the image capture and display apparatus of the present invention. The control unit may be arranged to be local to the camera system. The control unit may be arranged to be local to the display device. The control unit may be arranged to perform image transformation as described in relation to the method of the present invention.

It will be appreciated that aspects of the present invention described in relation to the apparatus of the present invention are equally applicable to the method of the present invention and vice versa. Thus, for example, the control unit of the present invention may possess those features which would enable the control unit to perform the function of the control unit of the apparatus of the present invention or may be arranged to control integers of the apparatus of the invention to cause them to perform certain steps of the method of the present invention.

DESCRIPTION OF THE DRAWINGS

By way of example an embodiment of the invention will now be described with reference to the accompanying schematic drawings, of which.

DETAILED DESCRIPTION

The embodiments of the invention illustrated by the accompanying drawings concern displaying to a remotely located operator stereographic images of a target region R surveyed by an unmanned aerial vehicle (UAV) in the form of a loitering missile. Typically, the vehicle will navigate a generally circular, or orbiting, path about the region R at its centre, however, the vehicle may navigate a straight path for at least some of its surveying time.

Figure 1:
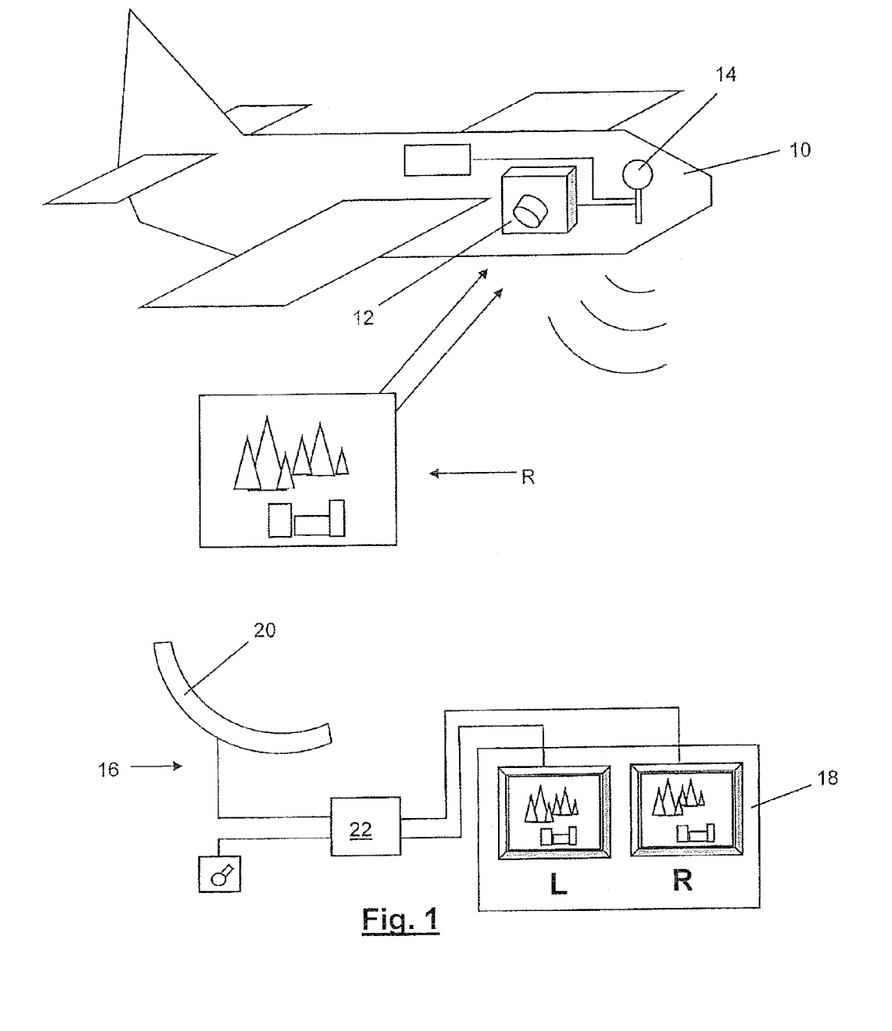
FIG. 1 shows a UAV with camera system and a ground-based display device according to a first embodiment of the invention.

FIG. 1 shows a UAV 10 on board which there is provided a camera system 12. The camera system 12 comprises a single camera which is mounted for angular movement to track and acquire images of a target region R on the ground, typically about 600 m from the UAV 10. One factor in determining the distance that the UAV navigates from the target is the resolution of the camera system. The camera system currently adopted has a resolution such that 600 m is a typical viewing distance. However, with camera systems having greater resolution, further distances may be appropriate such as 1-2 Km. At such distances over 500 m and bearing in mind that the UAV will be flying at low altitudes, the images captured by the camera system are generally side views of region R. Sideways viewing of a region at relatively low heights above ground level is preferable because it gives much greater coverage than looking vertically downwards where at low altitude image motion blur can be much greater depending on the camera type. A missile camera tends to have a narrow field of view, when compared with a reconnaissance camera, which would contribute to the smaller area coverage looking straight down.

As indicated above, the camera system comprises a tracking system for directing the camera towards the region R irrespective of movement of the vehicle. The camera is pivotally mounted in the camera system and is moved through an appropriate angle in response to movement of the vehicle in order to maintain line of sight with the region R. The camera system may include means for determining the angle through which the camera has rotated and outputting data corresponding to the camera's orientation.

When orbiting the region R, the vehicle will experience yaw, pitch and roll as well as changes in altitude, position and velocity. The camera system is adapted to compensate for such vehicle movement and maintain the camera boresight in line with the region R. The navigation systems aboard the vehicle are configured to output movement data corresponding to the vehicle's movement and position. The data corresponding to camera movement and vehicle movement is used to determine the angle between image vectors of successive images acquired by the camera system and to rectify the displayed images as will be explained in more detail below.

The UAV 10 also carries a radio transmitter 14 for transmitting data, including digital images, from the UAV 10 to a ground station, or other vehicle, 16 at a location remote from the target region R. The ground station 16 will typically be at a location spaced apart from the target region R by at least 1 km.

At the ground station 16, there is provided a display device 18 for displaying stereographic images. In this embodiment, the display device 18 is in the form of a virtual reality headset having two display screens, mounted in a helmet to be worn by the operator so that one display screen is viewed by the left eye and the other display screen is viewed by the right eye. The display device 18 is connected to a radio receiver 20 for receiving data from the transmitter 14 on the UAV 10. The display apparatus at the ground station 16 also includes a control unit in the form of an appropriately programmed computer 22. The computer 22 receives both digital images from the camera system 12 (via the transmitter 14 and receiver 20) and, for each captured image, both orientation data corresponding to movement of the camera system and movement data corresponding to vehicle movement and position relative to the target. The computer 22 processes the images and data to produce successive pairs of left and right images for display on the stereographic display device 18. The images are displayed substantially in real-time, and are thus displayed whilst the UAV 10 is moving.

Figure 2:
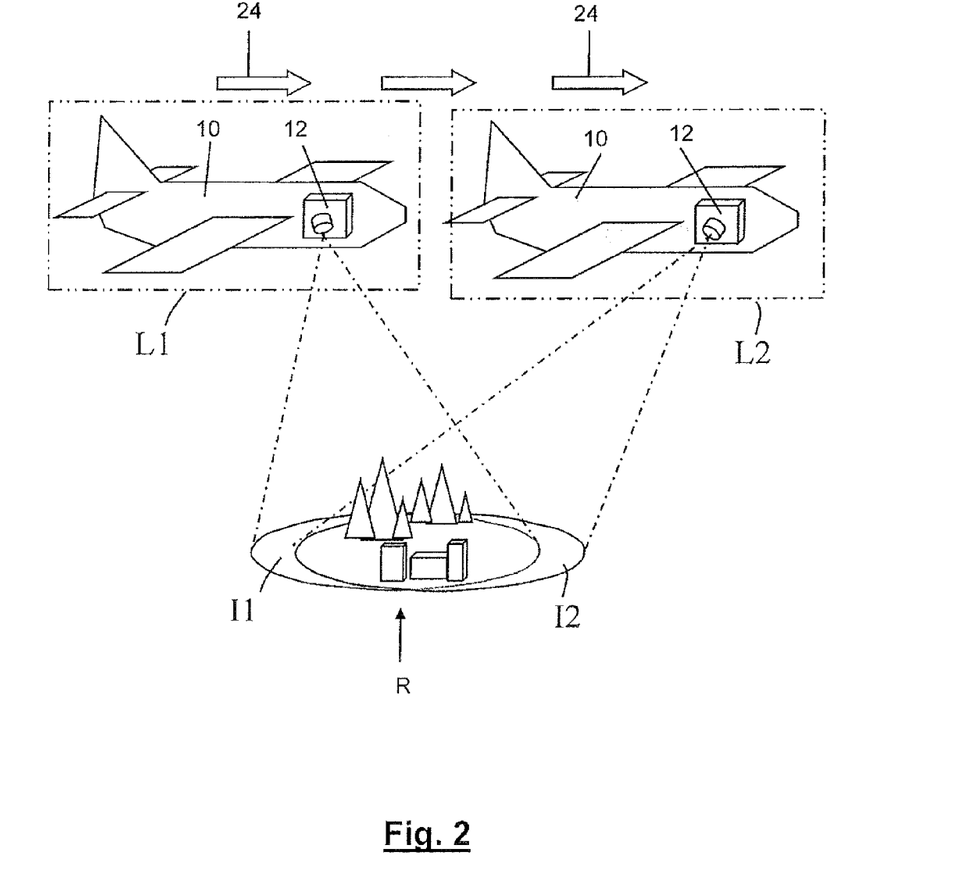
FIG. 2 shows the camera system of the UAV of FIG. 1 acquiring two successive images.

The basic principles of operation of the apparatus of the first embodiment will now be described with reference to FIGS. 2 and 3. In use, the UAV 10 and the associated camera system 12 move relative to the target region R, in the direction illustrated by arrows 24 in FIG. 2 which for simplicity in this example are shown as a straight line. If the vehicle is travelling in a circular path arrows 24 may be considered to project along a tangent to the circle. The camera system 12 acquires a first image I1 encompassing the target region R, whilst the UAV 10 is at a first location L1. The image is taken such that the image vector is transverse to the velocity vector of the UAV 10.

About a tenth of a second later, the camera system 12 subsequently acquires a second image I2 encompassing the target region R, at which time the UAV 10 is at a second location L2, spaced apart from the first location, typically by a distance of the order of 15 m (the vehicle having a speed of 150 ms$^{-1}$). It will be noted that the camera system moves through an angle relative to the vehicle between locations L1 and L2 in order to align its viewing angle along a boresight to the region R in order to capture images I1 and I2. In FIG. 2, only the position of the vehicle has changed, whilst its yaw, pitch, roll and altitude remain unchanged between L1 and L2. The process continues as the UAV 10 continues to fly circuits around the target region R (and keeping the target region R in view of the camera system 12). Thus, the camera system 12 acquires a third image I3, a fourth image I4, a fifth image I5, and so on. Accordingly, during movement of the vehicle relative to the region the camera system acquires a series of temporally sequential multiple images (I1, I2, . . . ) of the region at respective multiple different spaced apart locations of the vehicle relative to the region (L1, L2, . . . ) whereby the images are acquired at different respective image vectors relative to the region. Each displayed stereographic image comprises a first of the multiple images and a second of the multiple images temporally spaced apart in the series one from the other.

Figure 3:
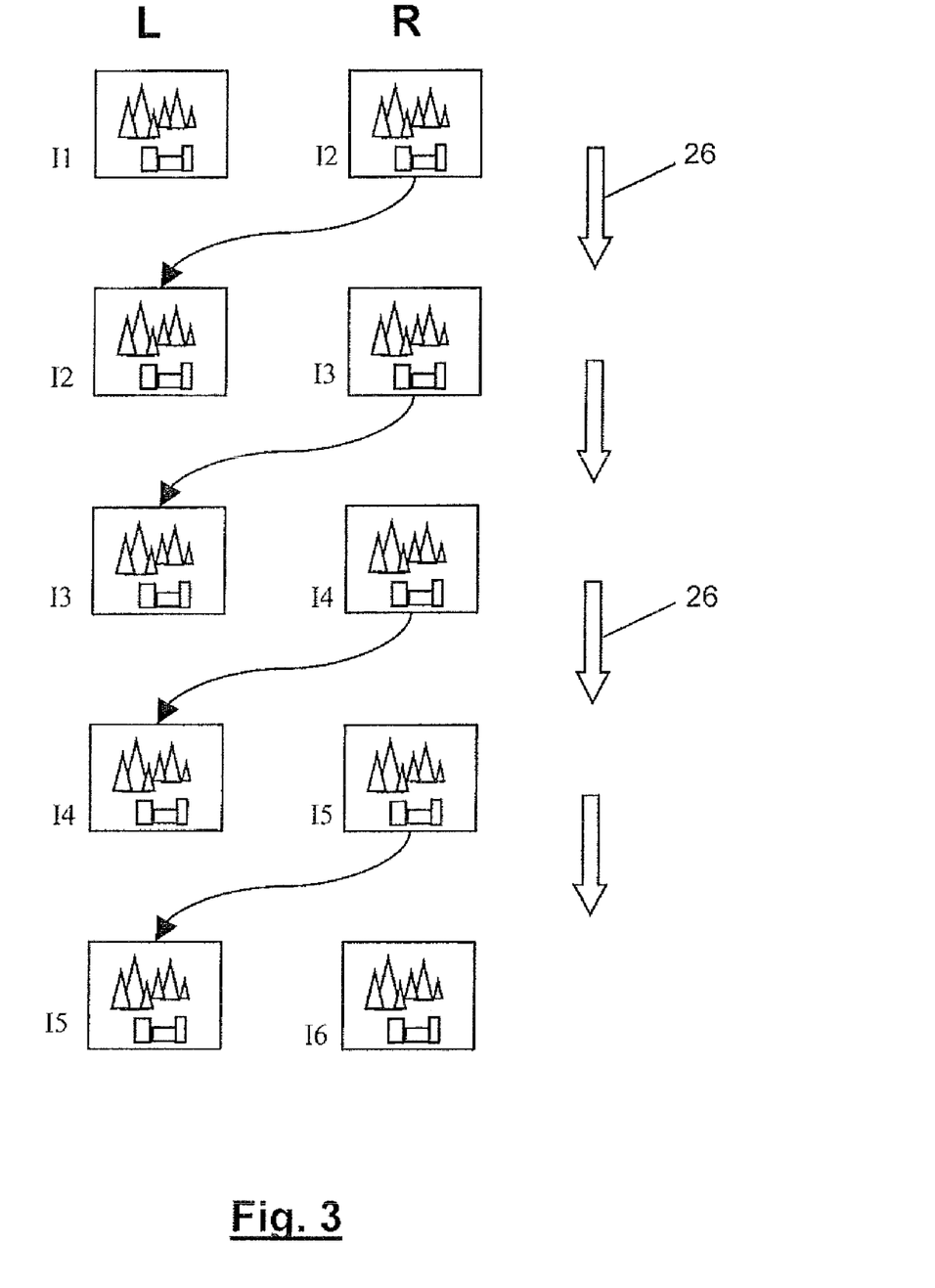
FIG. 3 shows schematically how images acquired by the camera system of the UAV of FIG. 1 are displayed.

As shown schematically in FIG. 3, the temporal sequential images I1, I2, . . . I6, etc are displayed two at a time, one image being displayed for viewing by the left eye (the column of images headed with the letter "L") and one image being displayed for viewing by the right eye (the column of images headed with the letter "R"). The passage of time is depicted in FIG. 3 by means of the arrows 26. Successive pairs of images may be displayed about once every tenth of a second (at a rate of about 10 Hz).

Initially, the first and second images I1, I2 acquired are displayed as a stereographic image. The stereographic image comprises a left-hand image and a right-hand images. In this embodiment, the first image I1 is the left image and the second image I2 is the right image. Subsequently, the second and third images I2, I3 are displayed as a stereographic image, with the second image I2 being the left image and the third image I3 being the right image. The process continues by loading a new image as the right image, and replacing the left image with the immediately preceding right image.

It will of course be appreciated that the images could be displayed in the opposite order so that the new image is loaded as the left image, the right image is replaced with the immediately preceding left image. The order in which the images are displayed on the left and right display panels of the stereographic display device 18 may depend on whether the camera system 12 views the target from the starboard side or the port side of the aircraft. In the present embodiment, the region R is kept in view of the camera system 12 for at least the majority of each circuit and the camera is arranged to view only to the starboard side of the UAV 10.

Further details concerning the first embodiment will now be described.

In order to enable the camera to track the target region R whilst the UAV 10 moves past the region R, the camera system 12 includes control unit (not shown separately) that receives data from the UAV 10 onboard systems concerning the position, velocity and orientation of the UAV 10 relative to a fixed coordinate system. The control unit also receives data concerning the orientation of the camera of the camera system 12. The control unit is also provided with information concerning the position of the target region R relative to the fixed coordinate system. The control unit is arranged to process such data and to calculate the movement necessary to move the camera so that it views the target region R, albeit from a different angle, given that the UAV 10 will have moved to a new location.

When displaying stereographic images, the epipolar lines of the two images should be parallel to allow proper viewing by an operator and the perspective of a 3-D image. If as shown in FIG. 2, images I1 and I2 are captured at locations L1 and L2 respectively, the camera system is at a first angle relative to the UAV at location L1 and at a second angle relative to the UAV at location L2. That is, the image vectors at L1 and L2 relative to the region R are at an angle. Accordingly, the epipolar lines of images I1 and I2 are not parallel and one or both of the images require rectification by transformation to produce parallel image planes.

The angle between the epipolar lines of I1 and I2 is dependent on a number of factors, including the distance of the vehicle from the region R (or the radius of the circular flight path), and the velocity of the vehicle. If for example the vehicle is navigating a generally circular path having a radius of 600 m at a velocity of 60 m/s, the angle $\theta$ between the epipolar lines of images I1 and I2 is about 5.7° i.e. 2 tan $\theta$=(60/2)/600. Accordingly, transformation of around 5.7° is required in order to display appropriate stereographic images. Less than 5.7° rectification may be acceptable although the stereographic images displayed may not be ideal. If the vehicle were travelling at a higher velocity (i.e. V>60 m/s) but at the same distance from the target (i.e. 600 m) and images are captured by the camera system at the same rate (i.e. 10 Hz), the difference in orientation of the image planes of images I1 and I2 would be greater since the angle of the camera system relative to region R between locations L1 and L2 would be greater. In this regard therefore, greater or less rectification is required dependent on the angular velocity of the vehicle relative to the region R.

Additionally, the angle required for rectification is affected by vehicle movement. Accordingly, the control unit receives movement data corresponding to movement of the vehicle in addition to orientation data from the camera system, and processes the data to determine the angle between image vectors of successive acquired images.

The control unit (computer 22) at the ground station 16 is arranged to perform image processing before the images captured by the camera system 12 are displayed on the display device 18. The images are corrected, or rectified, to reduce perceived distortion due to different image vectors, and also to ensure that both the left and right images relate to substantially the same area (increase/maximise overlap between the images), and to correct for image stabilisation.

As indicated above, the images may appear to be distorted if the left and right images were captured by the camera at significantly different viewing angles. This distortion is reduced by transforming both images to minimise the apparent angle between the image vector of the image and a notional pointing vector. The notional pointing vector in this embodiment is the average of the two image vectors of the left and right images. (It will be appreciated that the pointing vector may be smoothed over time to reduce the amount of wobble perceived in the images.)

The images are also cropped both to increase the overlap between the images and to stabilise the images displayed over time to the operator. The parts of the images left after cropping should of course include the target region R. It will be appreciated that it may not be possible to acquire successive images of the target region R that relate to exactly the same geographical area and that the overlap between successive images will typically be less than 100%. Also, successive images may be captured at different altitude, different distance from the target, and different twist angle of viewing. The variations over time of such variable may be smoothed by suitable image processing, which will act to reduce image wobble and distortion.

In the present embodiment the images acquired by the camera system 12 are larger (capturing more geographical area in each image) than the images that are displayed to enable the image processing as described above to be conducted.

The image processing that is conducted before displaying the captured image introduces a slight delay between capture of the image and subsequent display as a stereographic images. Also, because only one of the pair of images displayed is updated at a time, the stereographic image will include an image that was acquired at least a tenth of a second before display. However, in this embodiment, the delay between acquiring and displaying the images is less than half a second and the successive stereographic images are thus displayed substantially in real-time.

The apparatus further includes a switch connected to the control unit (computer 22) at the ground station 16 for enabling an operator to switch between a 3-D display mode and a 2-D display mode. The 2-D display mode is provided simply by means of displaying identical images as the left and right images of the stereographic display device 18.

In the first embodiment, each image acquired is used as a left and a right image, respectively, of two successive stereographic images that are displayed, as illustrated by FIG. 3.

Figure 4:
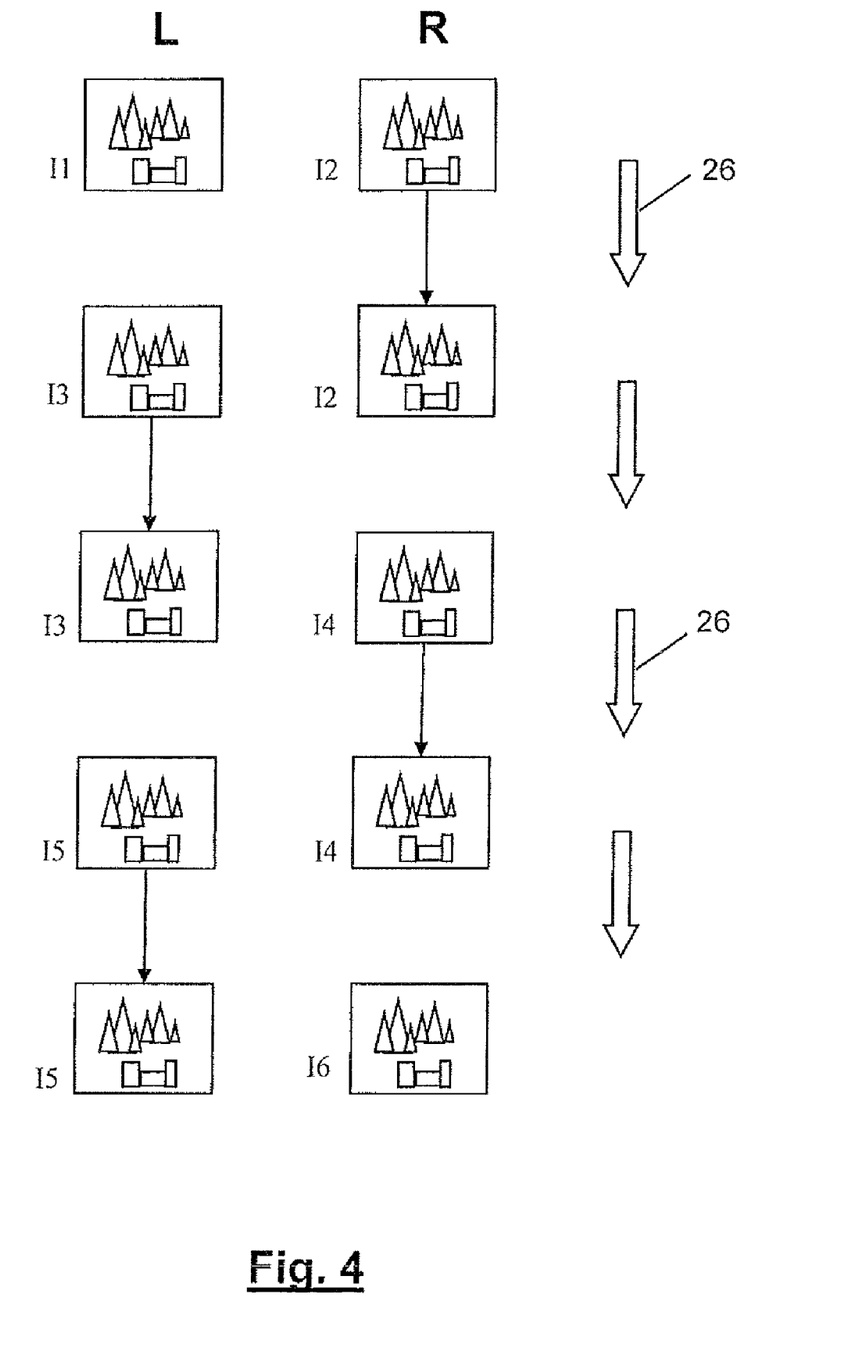
FIG. 4 shows schematically a first alternative method of displaying the images acquired by a camera system of a UAV according to a second embodiment of the invention.

As an alternative, however, each image may be used as exclusively the left image or the right image of two successive stereographic images that are displayed. Such an alternative is illustrated with reference to FIG. 4. Initially, the first and second images I1, I2 acquired are displayed as a stereographic image. The first image I1 is the left image and the second image I2 is the right image. Subsequently, the second and third images I2, I3 are displayed as a stereographic image, with the second image I2 remaining as the right image and the third image I3 being the left image. The process continues by loading a new image (fourth image I4 as a new right image), and retaining the third image as the left image. Then the left image only is replaced, then the right image only is replaced and so on. Thus, only one image is changed per cycle, the image being changed alternating between left and right. Such an alternative embodiment may be useful if screen refresh rates become a limiting factor.

With reference to FIG. 3, if the temporally sequential multiple images in a series are acquired at a rate of 50 Hz, but the vehicle speed is only 50 ms$^{-1}$, the spatial separation (viewing position) between temporally successive locations (L1, L2; L2, L3; L3, L4; etc) in the series would only be 1 meter. The stereographic image displayed using successively acquired images would lack depth. In such a case it may be better if the $1^{st}$ and, say, the $25^{th}$ images were displayed so that spatial separation is increased to 25 m and the temporal spacing between simultaneously displayed images is 0.5 seconds. However, simply displaying only every $25^{th}$ image would result in a display rate of 2 Hz. A rate of 2 Hz may produce unacceptable flicker on a display screen and be uncomfortable to view by an operator.

Figure 5:
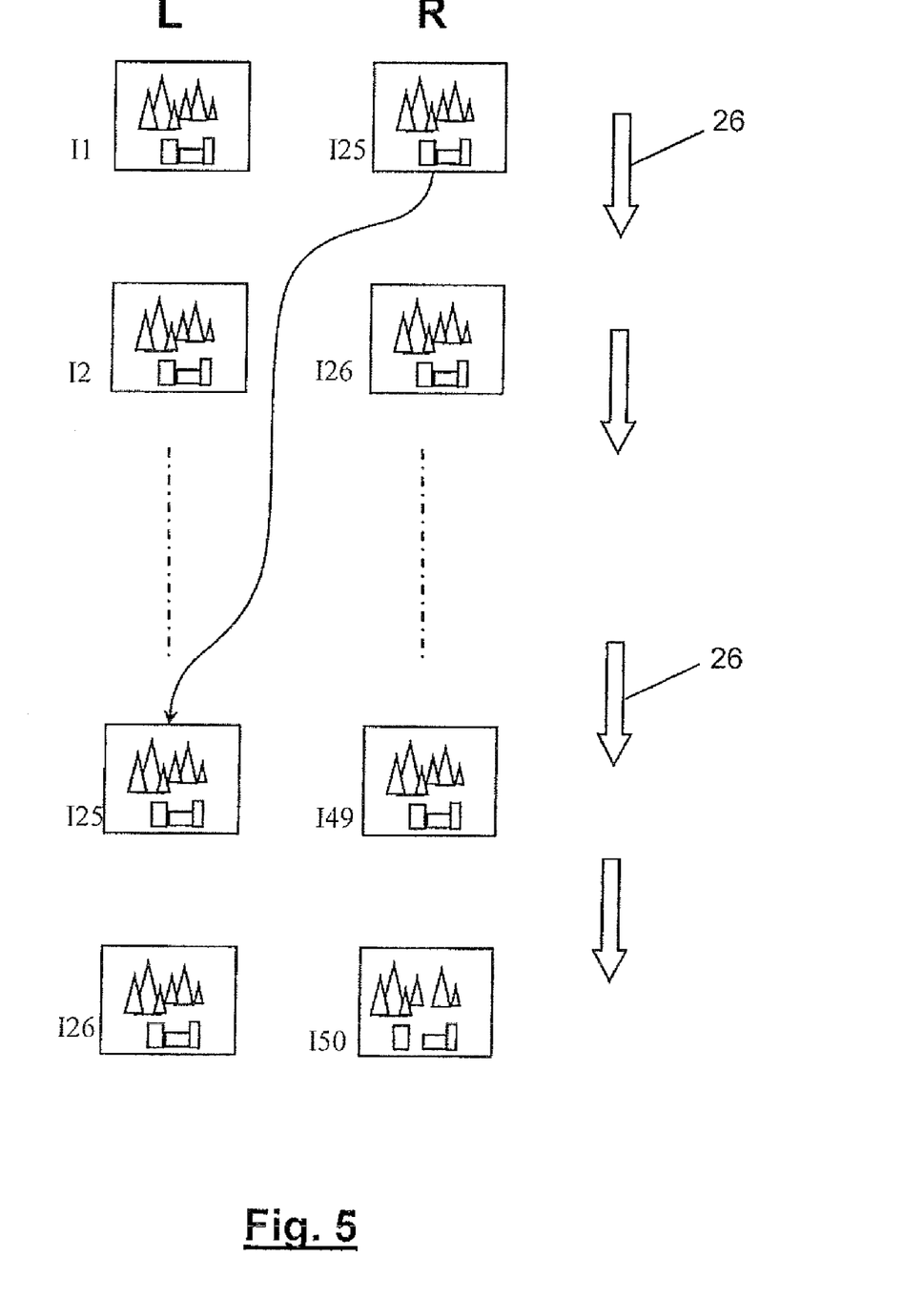
FIG. 5 shows schematically a second alternative method of displaying the images acquired by a camera system of a UAV according to a third embodiment of the invention.

In the alternative embodiment illustrated schematically in FIG. 5, the intervening images (between the $1^{st}$ and the $25^{th}$ image) are also displayed. Thus, the acquired images used in the stereographic display are temporally separated, by one or more of the other acquired images in the series, resulting in an interleaved sequence of images. The two displayed images are separated by a number of frames, which may be varied, for example in dependence on vehicle speed. In the sequence shown in FIG. 5, the images displayed are the $1^{st}$ and $25^{th}$ images, then the $2^{nd}$ and $26^{th}$ images, etc. so that the display rate is maintained at 50 Hz. This alternative display method thus provides a useful way of displaying stereographic images with a high refresh rate whilst ensuring that the left and right images are acquired by the vehicle when at two sufficiently spaced-apart locations to give enhanced perspective (better 3-D view) in the stereographic image displayed. Thus for a vehicle travelling at 50 ms$^{-1}$, with images acquired at a rate of 50 Hz, the vehicle moves just 1 meter between successive images. Using the $1^{st}$ and $101^{st}$ images, and then the $2^{nd}$ and $102^{nd}$, and so on, to produce the stereographic images allows for a fast refresh rate (50 Hz) using images captured at positions 100 m apart with a UAV travelling at a relatively low speed.

Accordingly, the temporal spacing between a first of the multiple images and a second of the multiple images in a series is varied according to a velocity of the vehicle relative to the region so that the spatial separation between a first and the second of the multiple images is not less than a predetermined distance so that the stereographic images having a required depth can be displayed independent of the velocity of the vehicle relative to the region.

As described above, at a first velocity of the vehicle relative to the region the first and the second of the multiple images are spaced apart by a first number of images in the series (e.g. 25) and at a second velocity relative to the region the first and the second of the multiple images are spaced apart by a second number of images in the series (e.g. 100).

It will be appreciated that the distance of the vehicle from the region affects the depth of a stereographic image. For example, a required depth may be achievable at a spatial separation of 10 m between images in a series at a distance of 100 m from the region R whereas a required depth may be achievable only at a spatial separation of at least 25 m at a distance of 1 km from the region R.

When the temporal spacing of first and second images in a displayed stereographic image is varied by the control unit, the angle between the respective image vectors is also varied. Accordingly, rectification of one or both of the images should be adjusted depending on the variation in temporal spacing of the first and second images. For example if a series of images are acquired by the camera system at 60 Hz and the speed of the vehicle is 60 m/s, an image is captured every 1 m. If successive images in the series are displayed together, then depending on the distance of the vehicle from the region, the images may not require rectification (or may require rectification through only a small angle). For example, if the distance to the region R is 600 m, the angle between image vectors is 0.01° and rectification is not required to display an acceptable stereographic image. However, if it is determined by the control unit that images which are spaced apart by only 1 m do not provide sufficient depth, the control unit will increase the temporal spacing between first and second images in a displayed image. For example, the spacing may be increased to 1 second so that the spatial separation between images is 60 m. In this case, the angle between image vectors will be increased to 5.7° and therefore rectification is required.

In addition to the requirements for production of stereographic images which have sufficient depth and are rectified, and displayed at sufficient refresh rate, it is also necessary to consider the transmission of images and data from the vehicle to the ground station. The available bandwidth of the transmission limits the rate and/or size of images that can be transmitted. One way in which determination of the bandwidth may be achieved is by transmitting a control signal from the transmitter for verification by the receiver. The receiver response to the transmitter verifying the accuracy of the control signal. If the control signal cannot be verified by the receiver, the receiver and the transmitter co-operate to select a different bandwidth and/or frequency, and the rate at which images are acquired and/or transmitted is changed accordingly. For example, the bandwidth may restrict the rate at which images may be captured by the camera system and transmitted to the ground station to 10 Hz. Accordingly, it may be necessary to reduce the depth of a displayed stereographic image in order to reduce display flicker. Alternatively, it may be desirable for an operator to increase a vehicle velocity so that for a given bandwidth better depth can be achieved.

In use of the apparatus of the first embodiment of the invention an operator may select a target and program the UAV 10 with positional information concerning the target and the UAV 10 may then navigate to the target and then loiter in the region R of the target. Stereographic images of the region R surrounding and including the target are then viewed by the operator, including images taken from differing angles and perspectives. The target may then be verified by the operator, and control signals may be sent from the ground station 16 to the UAV 10 to take appropriate action (via a transmitter on the ground and a receiver on the UAV 10).

Whilst the present invention has been described and illustrated with reference to particular embodiments, it will be appreciated by those of ordinary skill in the art that the invention lends itself to many different variations not specifically illustrated herein. By way of example only, certain possible variations will now be described.

When moving the moveable camera to track a particular target region, one or more distinctive and recognisable features of a target region may be ascertained and then tracked in between capturing successive images of the target region. Such a system may negate the need for reliance on positional date from the onboard systems of the UAV.

The camera system may be arranged to view selectively to the port or starboard side of the vehicle, rather than being limited to one side only. Two cameras may be provided for such a purpose, one dedicated to viewing from the port side and one dedicated to viewing from the starboard side.

The camera system may comprise a static camera, which remains stationary relative to the vehicle between capturing images of the region.

Rather than transmitting data with the images for image processing by a computer on the ground, the control on the UAV may be arranged to process the images before transmission, thereby reducing the bandwidth of data that needs transmitting from the UAV to the ground station.

The stereoscopic viewer may be of a form other than a virtual reality head-set. For example, the display device may produce pairs of differently polarised images and the operator may wear glasses with polarised lenses that separate out the left and right images for viewing by the operator.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of displaying stereographic images of a region, the method comprising the following steps:
   moving a vehicle relative to the region, the vehicle carrying a camera system for acquiring images of the region,
   during movement of the vehicle relative to the region acquiring a series of temporally sequential multiple images of the region at respective multiple different spaced apart locations of the vehicle relative to the region,
   displaying successive stereographic images of the region during movement of the vehicle relative to the region,
   wherein each stereographic image comprises a first of said multiple images acquired at a first location and a second of said multiple images acquired at a second location which are temporally spaced apart by a number of images in the series one from the other,
   determining a velocity of the vehicle relative to the region, and
   varying the temporal spacing of the first of said multiple images and the second of said multiple images according to said velocity,
   wherein at a first velocity of the vehicle relative to the region the first and the second of the multiple images are spaced apart by a first number of images in the series and at a second velocity relative to the region the first and the second of the multiple images are spaced apart by a second number of images in the series,
   wherein the spatial separation between the first and the second locations is not less than a predetermined amount so that the stereographic images having a required depth can be displayed independent of the velocity of the vehicle relative to the region.

2. A method according to claim 1, comprising varying the temporal spacing of the first of said multiple images and the second of said multiple images according to a distance of the vehicle from the region so that the spatial separation between the first and the second locations is not less than a predetermined amount so that the stereographic images having a required depth can be displayed independent of the distance of the vehicle from the region.

3. A method according to claim 1, comprising the step of adjusting the rectification of one or both of the first of said multiple images and the second of said multiple images dependent on the variation of temporal spacing between the images.

4. A method according to claim 1, wherein the stereographic image is displayed at a location remote from both the region and the vehicle.

5. A method according to claim 4, comprising:
   determining an available bandwidth of transmission between the vehicle and the remote location,
   varying the rate at which the series of temporally sequential multiple images are acquired and/or the rate at which images are transmitted to the remote location according to the available bandwidth, and
   varying the temporal spacing between the first and the second images to allow stereographic images to be displayed substantially without flicker.

6. A method according to claim 1, wherein the camera system comprises a moveable camera, which moves relative to the vehicle between capturing images of the region.

7. A method according to claim 1, wherein successive stereographic images are displayed at a rate greater than 2Hz.

8. Apparatus for displaying stereographic images of a region, comprising:
   a camera system mountable on a vehicle for acquiring a series of temporally sequential multiple images of the region at respective multiple different spaced apart locations of the vehicle relative to the region during movement of the vehicle,
   a display device for displaying successive stereographic images of the region during movement of the vehicle relative to the region, and
   a control unit configured for:
      controlling the display of stereographic images so that each stereographic image comprises a first of said multiple images acquired at a first location and a second of said multiple images acquired at a second location which are temporally spaced apart in the series one from the other,
      determining a velocity of the vehicle relative to the region, and
      varying the temporal spacing of the first of said multiple images and the second of said multiple images according to said velocity,
   wherein at a first velocity of the vehicle relative to the region the control unit is configured to control the display so that the first and the second of the multiple images are spaced apart by a first number of images in the series and at a second velocity relative to the region the first and the second of the multiple images are spaced apart by a second number of images in the series,
   wherein the spatial separation between the first and the second locations is not less than a predetermined amount so that stereographic images having a required depth can be displayed independent of the velocity of the vehicle relative to the region.

9. Apparatus according to claim 8, wherein the control unit is configured to vary the temporal spacing of the first of said multiple images and the second of said multiple images according to a distance of the vehicle from the region so that the spatial separation between the first and the second locations is not less than a predetermined distance so that the stereographic images having a required depth can be displayed independent of the distance of the vehicle from the region.

10. Apparatus according to claim 8, wherein the control unit is configured to adjust the rectification of one or both of the first of said multiple images and the second of said multiple images dependent on the variation of temporal spacing between the images.

11. Apparatus according to claim 8, comprising a transmitter for transmitting acquired images to a remote location, a receiver for receiving the transmitted images at the remote location and providing the acquired images to the control unit for processing.

12. Apparatus according to claim 11, comprising:
   means for determining an available bandwidth of transmission between the transmitter and the receiver and varying the rate at which the series of temporally sequential multiple images are acquired and/or transmitted to the remote location according to the available bandwidth, wherein the control unit is configured for varying the temporal spacing between the first and the second images to allow stereographic images to be displayed substantially without flicker.

13. A camera system and transmitter arranged for use in the apparatus of claim 11.

14. An aircraft including a camera system and transmitter according to claim 13.

15. A display device and receiver arranged for use in the apparatus of claim 11.

16. A display device, receiver and control unit arranged for use in the image capture and display apparatus of claim 11.

17. An apparatus according to claim 8, wherein the apparatus further includes a switch arranged to cause switching of the display device between display of stereographic images by the display device and display of a 2-dimensional image display by the display device.

18. A control unit arranged for use in the apparatus of claim 8.

19. A method of displaying stereographic images of a region, the method comprising the following steps:
moving a vehicle relative to the region and outputting movement data from an on-board system corresponding to vehicle movement;
acquiring images of the region with a camera system comprising a camera mounted on the vehicle and orientating the camera so that it is along a line of sight with the region irrespective of movement of the vehicle, and outputting orientation data corresponding to the orientation of the camera;
during movement of the vehicle relative to the region acquiring a series of temporally sequential multiple images of the region at respective multiple different spaced apart locations of the vehicle relative to the region whereby the images are acquired at different respective image vectors relative to the region,
displaying successive stereographic images of the region during movement of the vehicle relative to the region,
wherein each stereographic image comprises a first of said multiple images acquired at a first image vector and a second of said multiple images acquired at a second image vector which are temporally spaced apart in the series one from the other, and rectifying one or both of the first of said multiple images and the second of said multiple images according to an angle between the first image vector and the second image vector in the displayed stereographic image dependent on the movement data and orientation data;
determining a velocity of the vehicle relative to the region, and
varying the temporal spacing of the first of said multiple images and the second of said multiple images according to said velocity,
wherein at a first velocity of the vehicle relative to the region the control unit is configured to control the display so that the first and the second of the multiple images are spaced apart by a first number of images in the series and at a second velocity relative to the region the first and the second of the multiple images are spaced apart by a second number of images in the series,
wherein the spatial separation between the first and the second locations is not less than a predetermined amount so that stereographic images having a required depth can be displayed independent of the velocity of the vehicle relative to the region.

* * * * *